(12) United States Patent
Bukhari et al.

(10) Patent No.: US 11,727,698 B2
(45) Date of Patent: Aug. 15, 2023

(54) IDENTIFYING ELEMENTS IN AN ENVIRONMENT

(71) Applicant: AutoGuide, LLC, Chelmsford, MA (US)

(72) Inventors: Syed Mohammed Jerrar Bukhari, Chelmsford, MA (US); Tyler Barron, Chelmsford, MA (US); Justin Holwell, Chelmsford, MA (US)

(73) Assignee: AUTOGUIDE, LLC, Chelmsford, MA (US)

( * ) Notice: Subject to any disclaimer, the term of this patent is extended or adjusted under 35 U.S.C. 154(b) by 128 days.

(21) Appl. No.: 16/871,293

(22) Filed: May 11, 2020

(65) Prior Publication Data

US 2021/0349468 A1 Nov. 11, 2021

(51) Int. Cl.
*G05D 1/02* (2020.01)
*G06V 10/25* (2022.01)

(52) U.S. Cl.
CPC ......... *G05D 1/0251* (2013.01); *G05D 1/0219* (2013.01); *G05D 1/0221* (2013.01); *G05D 1/0253* (2013.01); *G06V 10/25* (2022.01)

(58) Field of Classification Search
None
See application file for complete search history.

(56) References Cited

U.S. PATENT DOCUMENTS

| | | | |
|---|---|---|---|
| 6,952,488 B2 | 10/2005 | Kelly et al. | |
| 9,715,232 B1 | 7/2017 | Fischer et al. | |
| 9,864,911 B1 | 1/2018 | Curlander et al. | |
| 10,007,266 B2 | 6/2018 | Fischer et al. | |
| 10,114,372 B1* | 10/2018 | Theobald | G05B 19/4189 |
| 10,242,273 B1* | 3/2019 | Eckman | G06Q 50/28 |
| 2010/0310182 A1* | 12/2010 | Kroepfl | G06V 10/462 |
| | | | 707/E17.017 |
| 2015/0347840 A1* | 12/2015 | Iida | G01S 7/4802 |
| | | | 382/103 |
| 2016/0090284 A1 | 3/2016 | Svensson et al. | |
| 2016/0332554 A1* | 11/2016 | Ambrosio | G05D 1/024 |
| 2017/0113352 A1* | 4/2017 | Lutz | G05D 1/0291 |
| 2017/0302905 A1* | 10/2017 | Shteinfeld | G06T 7/62 |
| 2018/0089517 A1 | 3/2018 | Douglas et al. | |
| 2018/0281178 A1 | 10/2018 | Jacobsen | |
| 2018/0374036 A1 | 12/2018 | Nazarian et al. | |

(Continued)

FOREIGN PATENT DOCUMENTS

JP 2012-137304 A 7/2012

OTHER PUBLICATIONS

U.S. Appl. No. 62/738,697, filed Sep. 28, 2018, (73 pages).

(Continued)

*Primary Examiner* — Santiago Garcia
(74) *Attorney, Agent, or Firm* — Burns & Levinson LLP (57) ABSTRACT

An example method of detecting an element using an autonomous vehicle includes the following operations: using a sensor on the autonomous vehicle to capture image data in a region of interest containing the element, where the image data represents components of the element; filtering the image data to produce filtered data having less of an amount of data than the image data; identifying the components of the element by analyzing the filtered data using a deterministic process; and detecting the element based on the components.

21 Claims, 9 Drawing Sheets

(56) References Cited

U.S. PATENT DOCUMENTS

| | | | |
|---|---|---|---|
| 2019/0194005 A1* | 6/2019 | Shah | G05D 1/024 |
| 2019/0370567 A1* | 12/2019 | Eckman | G06V 20/54 |
| 2019/0384314 A1 | 12/2019 | Jacobsen | |
| 2020/0004247 A1 | 1/2020 | Jacobsen et al. | |
| 2020/0055671 A1* | 2/2020 | Toebes | B65G 1/1373 |
| 2020/0102147 A1 | 4/2020 | Sullivan et al. | |
| 2020/0103882 A1 | 4/2020 | Sullivan et al. | |
| 2020/0180647 A1* | 6/2020 | Anthony | G06V 20/56 |
| 2021/0114826 A1* | 4/2021 | Simon | B65G 59/023 |
| 2021/0182996 A1* | 6/2021 | Cella | G06Q 30/0202 |
| 2021/0272037 A1* | 9/2021 | Hanebeck | H04W 4/35 |
| 2022/0004198 A1* | 1/2022 | Ryu | G05D 1/024 |
| 2022/0036302 A1* | 2/2022 | Cella | H04L 9/3239 |

OTHER PUBLICATIONS

U.S. Appl. No. 62/738,800, filed Sep. 28, 2018, (62 pages).
MIR 100 User Guide. Mobile Industrial Robots A/S. Odense, SØ. (Aug. 2018). V. 1.1, (pp. 1-42). 44 pages.
MIR 100 User Guide. Mobile Industrial Robots A/S. Odense, SØ. (Nov. 2017). V. 1.0, (pp. 1-37). 39 pages.
MIR 500 User Guide. Mobile Industrial Robots A/S. Odense, SØ. (Sep. 2019). V. 1.3, (pp. 1-100). 100 pages.
MIR Fleet Reference Guide. Mobile Industrial Robots A/S. Odense, SØ. (Jan. 2017). V. 1.0, (pp. 1-30). 32 pages.
Navitrol Pallet Detection. Navitec Systems. Espoo, Finland. (May 2018). V. 1.2, (pp. 1-8). 8 pages.
Varga, Robert. (Robert). "Vision-based Autonomous Load Handling for Automated Guided Vehicles", 2014 IEEE 10th International Conference on Intelligent Computer Communication and Processing (ICCP), Cluj Napoca, Romania, Sep. 4-6, 2014. Technical University of Cluj Napoca, IEEE. (6 pages).
Waheed, Imran. (Dec. 2006). "Trajectory / Temporal Planning of a Wheeled Mobile Robot" (Corpus ID No. 61900664) [Degree of Master of Science in the Department of Mechanical Engineering, University of Saskatchewan, Canada]. Semantic Scholar.org. (111 pages).
International Search Report for PCT Application No. PCT/US2021/030206, dated Aug. 20, 2021, (4 pages).
Written Opinion for PCT Application No. PCT/US2021/030206, dated Aug. 20, 2021, (4 pages).
International Preliminary Report on Patentability for PCT Application No. PCT/US2021/030206, dated Nov. 15, 2022, (5 pages).
Communication pursuant to Rule 164(1) EPC for European Application No. 21803197.9, dated Jun. 19, 2023. (18 pages).
Kumar Swagat et al.: "Design and Development of an automated Robotic Pick & Slow System for an e-commerce Warehouse", Arxiv.org, Cornell University Library, 201 Olin Library Cornell University Ithaca, NY 14853, Mar. 7, 2017 (Mar. 7, 2017), pp. 1-15, XP080754871.
Benjamin Molter et al.: "Real-time Pallet Localization with 3D Camera Technology for Forklifts in Logistic Environments", 2018 IEEE International Conference on Service Operations and Logistics, and Informatics (Soli, Jul. 31, 2018 (Jul. 31, 2018), pp. 297-302, XP033409994, DOI: 10.1109/SOLI.2018.8476740 [retrieved on Sep. 28, 2018].
Junhao Xiao et al.: "Pallet recognition and localization using an RGB-D camera", International Journal of Advanced Robotic Systems, vol. 14, No. 6, Nov. 6, 2017 (Nov. 6, 2017), XP055719236, CR ISSN: 1729-8814, DOI: 10.1177/1729881417737799.

* cited by examiner

IDENTIFYING ELEMENTS IN AN ENVIRONMENT

TECHNICAL FIELD

This specification relates generally to examples of a mobile robot configured to detect elements in an environment.

BACKGROUND

Forklifts or other drivable machinery may be used to lift elements in a space, such as a warehouse or manufacturing facility, and to move those elements from one location to another location. Examples of elements include pallets and containers. An example pallet includes a flat transport structure that supports goods during lifting. An example container includes a transportable structure having one or more vertical walls and having an inter-locking mechanism designed to prevent relative motion between the elements.

SUMMARY

An example method of detecting an element using an autonomous vehicle includes the following operations: using a sensor on the autonomous vehicle to capture image data in a region of interest containing the element, where the image data represents components of the element; filtering the image data to produce filtered data having less of an amount of data than the image data; identifying the components of the element by analyzing the filtered data using a deterministic process; and detecting the element based on the components. The sensor may be or include a three-dimensional (3D) camera. The method may include one or more of the following features, either alone or in combination.

Filtering may be based, at least in part, on an expected location of the element. Identifying the components may include locating multiple structures represented by the filtered data that extend along a same (e.g., a first) dimension and that are separated by a predefined space. Identifying the components may include locating multiple structures represented by the filtered data that extend along a second dimension that is different from the first dimension. The first dimension may be a vertical dimension in three-dimensional (3D) space and the second dimension may be a horizontal dimension in the 3D space. The filtered data may be part of a point cloud. The point cloud may include at least some points arranged based on a shape of the element. The deterministic process may include the following operations: generating clusters of points having predefined connectivity; and detecting clusters that are a predefined distance apart from a nearest neighboring cluster. The deterministic process may also include eliminating at least one of the clusters from consideration for not meeting a predefined condition. The predefined condition may be or include co-linearity. The predefined condition may be geometrical or statistical in nature. The predefined condition and/or the predefined distance may be tunable.

The element may be a stackable element that includes pillars and decks. The operations may be performed to identify the pillars and/or to identify the decks. Generating the clusters of points may include identifying points that are adjacent. Identifying the points that are adjacent may include identifying points along a same dimension or at an angle relative to the dimension if there is a discontinuity in the points along the dimension. The element may be located on a rack and the region of interest may be less than a space encompassed by the rack.

The method may include storing a library containing attributes of different types of elements. The component may be identified based, at least in part, on one or more attributes from the library. The method may include identifying the rack using the sensor and pointing the sensor above a bottom of the rack toward the region of interest.

The element may be a rack comprised of pillars and beams. In this example, identifying the components may include: identifying the pillars based on filtered data aggregated along a first dimension; and identifying the beams based on filtered data aggregated along a second dimension that is different from the first dimension.

An example system includes an autonomous vehicle having a sensor to capture image data in a region of interest containing an element. The image data represents components of the element. The system includes a control system to perform operations that include: filtering the image data to produce filtered data having less of an amount of data than the image data; identifying the components of the element by analyzing the filtered data using a deterministic process; and detecting the element based on the components.

An example method is performed by an autonomous vehicle to detect a volume in which to place an element. The method includes the following operations: detecting a rack containing the volume; pointing a sensor above a bottom of the rack to a region of interest; detecting the volume based on 3D data within a first part of the region of interest and a lack of 3D data within a second part of the region of interest; and determining, based on the 3D data and dimensions of the element, whether the volume is large enough to fit the element. The method may include the following features, either alone or in combination.

Detecting the volume may include attempting detection of 3D data within the second part of the region of interest; and detecting less than a predetermined amount of 3D data within the second part of the region of interest. Detecting the volume may include detecting the 3D data within the first part of the region of interest by outputting light and detecting reflection of the light. Attempting detection of 3D data within the second part of the region of interest may include outputting light in the volume. Detecting less than the predetermined amount of 3D data may include detecting less than a predetermined amount of light reflection. Detecting less than the predetermined amount of light reflection may include no light reflection.

The method may include aligning the element within the volume. Detecting the rack may include: using the sensor to capture image data in a region of interest containing the rack, where the image data represents components of the rack; identifying the components of the rack by analyzing the image data using a deterministic process; and detecting the rack based on the components. The components may include pillars. Identifying the pillars may include locating one or more structures represented by the data that extend along a same dimension and that are separated by a predefined space. The components may include beams. Identifying the beams may include locating one or more structures represented by the data that extend along a same dimension and that are separated by a predefined space. The same dimension may be a first dimension. Identifying the beams may include locating multiple structures represented by the data that extend along a second dimension that is different from the first dimension. The first dimension may be a vertical dimension in 3D space and the second dimension may be a horizontal dimension in the 3D space.

The method may include storing a library containing attributes of different types of racks. The component may be identified based, at least in part, on one or more attributes from the library.

Any two or more of the features described in this specification, including in this summary section, can be combined to form implementations not specifically described herein.

The example vehicles and techniques described herein, or portions thereof, can be implemented using, or controlled by, a computer program product that includes instructions that are stored on one or more non-transitory machine-readable storage media, and that are executable on one or more processing devices to control (e.g., coordinate) the operations described herein. The example vehicles and techniques described herein, or portions thereof, can be implemented as an apparatus or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are examples of techniques for detecting elements in an environment using an autonomous vehicle. The techniques include operations such as using a sensor on the autonomous vehicle to capture image data in a region of interest containing an element, filtering the image data to produce filtered data having less of an amount of data than the captured image data, identifying components that are parts of the element by analyzing the filtered data using a deterministic process, and detecting the element based on the components. Detecting the element includes locating boundaries of the element in the environment and/or identifying what the element is.

Autonomous vehicles used as examples herein include mobile robots (or simply "robots"); however, any appropriate type of autonomous vehicle may be used including, but not limited to, self-driving machinery or stationary robots.

The elements used as examples herein include pallets and containers; however, any appropriate types of elements may be used including, but not limited to, boxes, racks, crates, or bins. As noted, an example pallet includes a flat transport structure that supports goods during lifting. A pallet also includes a mechanism called a socket that the robot's end-effectors may enter and that are used to connect to, and to lift, the pallet. An example container includes a transportable structure having one or more vertical walls and having an inter-locking mechanism designed to prevent relative motion.

An example autonomous vehicle, such as a robot, includes a body configured for movement along a surface such as the floor of a warehouse. After a first element is detected, the end-effector, such as a fork containing one or more tines, is configured to engage and to lift the element. For example, the first element may be a pallet that the end-effector lifts and moves off of, or onto, a second element such as a stack of pallets or a rack. The example techniques described herein may also obtain information about the rack, the stack, or both, and use that information when moving the first element.

A control system, which may include one or more processing devices examples of which are described herein, is configured—for example programmed—to control the end-effector, the robot body, or both the end-effector and the robot body to move in three or more degrees of freedom—for example, in at least four degrees of freedom—to stack the first element on top of the second element or to lift the first element off of the second element and move it away from the second element. The control system may be on-board the autonomous vehicle, remote from the autonomous vehicle, or a combination of on-board and remote. The control system may use the information from various sensors to execute the operations to detect the first element, the second element, or both, and then to control the autonomous vehicle to move the first element relative to the second element as described herein.

In an example, stacking may include placing the first element on top of the second element. Operations executed to perform the stacking may include, but are not limited to, the following: moving the first element to align a first feature such as a corner of the first element to a second feature such as a corner of a second element, moving the first element to align a second feature of the first element to a fourth feature of the second element and, following these alignments, moving the first element into contact with the second element so that the first feature mates to the third feature and the second feature mates to the fourth feature. Other processes may be performed to place elements on a stack, a rack, or other appropriate location.

Figure 1:
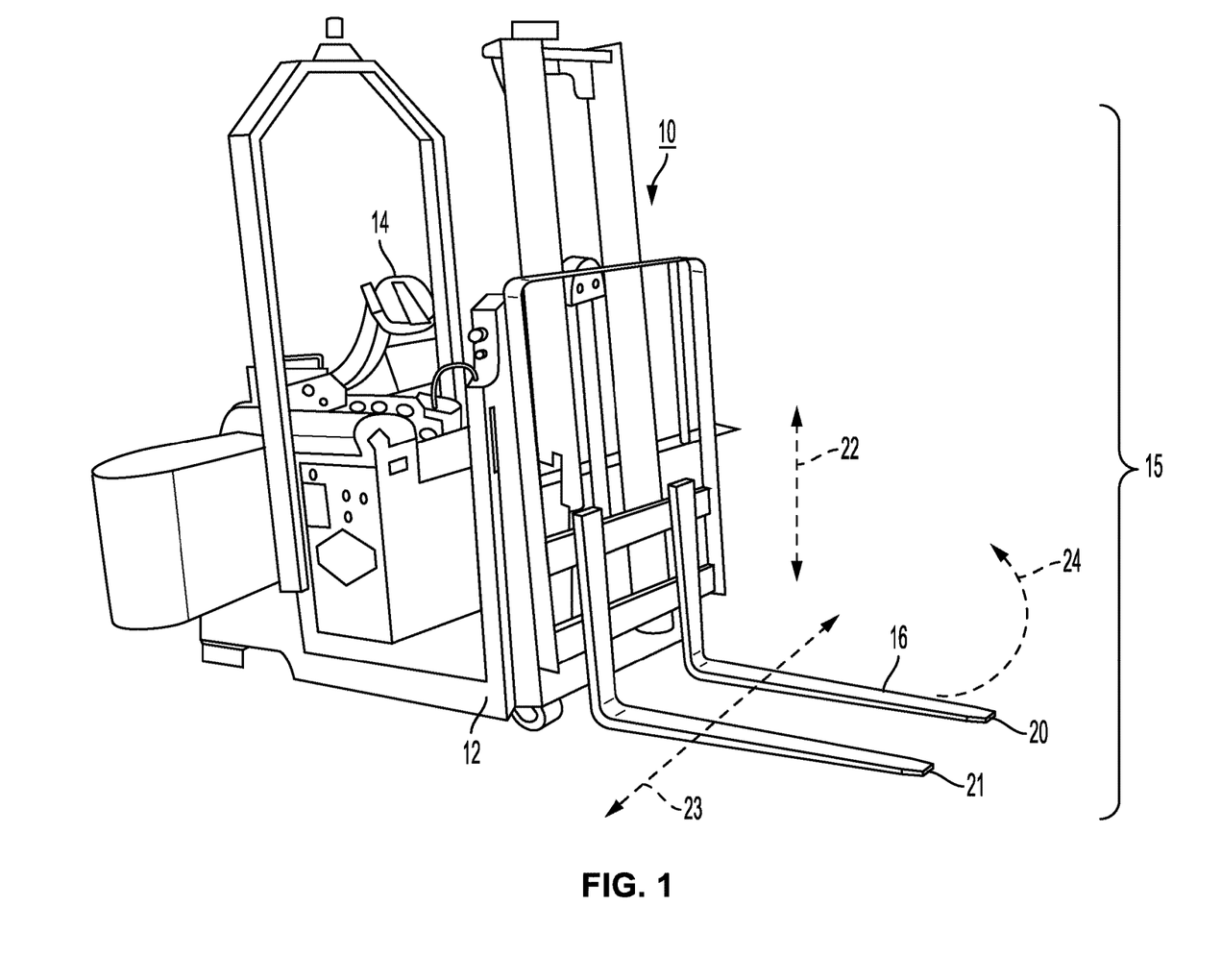
FIG. 1 is a photorealistic diagram showing a perspective view of an example autonomous vehicle.

FIG. 1 shows an example of a robot 10 that is configured to move in multiple degrees of freedom to lift elements and to stack one element on top of another element. In this example, robot 10 is autonomously-controllable even though it includes mechanisms 14 for manual control. In an example, autonomously-controllable includes the robot moving of its own accord based on sensor inputs and, in some cases, inputs from a remote system such as a fleet control system. Robot 10 includes a body 12 having wheels (not shown) to enable robot 10 to travel across a surface, such as the floor of a warehouse, a factory, or other terrain. Robot 10 also includes a support area 15 configured to support the weight of an element, such as a pallet, a container, or any other device to be manipulated, using an end-effector 16. In this example, robot 10 may be controlled to transport the element from one location to another location.

As shown in FIG. 1, end-effector 16 includes a fork comprised of two tines 20, 21 in this example. Other types of end-effectors may be used, such as a plate or a gripper. The tines may be configured for vertical movement in the directions of arrow 22. The vertical movement enables the tines to pick-up an element and to move the element to an appropriate vertical height for stacking. The vertical movement also enables the tines to reach a height of an element to be removed from a stack, a rack, or another location. The tines also may be configured for horizontal movement in the directions of arrow 23. In some examples, the tines are interconnected and, therefore, move together. In some examples, each tine may be configured for independent and separate horizontal movement along the directions of arrow 23. That is, each tine may move relative to the other tine to adjust the distance between the two (or pitch). This adjustment may be necessary to accommodate elements having different socket locations. In some examples, each tine may be configured for independent and separate vertical movement along the directions of arrow 23. In some implementations, one of the tines may be movable out of the way to allow a single tine to interact with an element or other element. For example, a tine 20 may be rotatable by 90° in the direction of arc 24, leaving tine 21 in position to interact with an element or other element located in front of robot 10. The other tine 21 may operate similarly.

Figure 2:
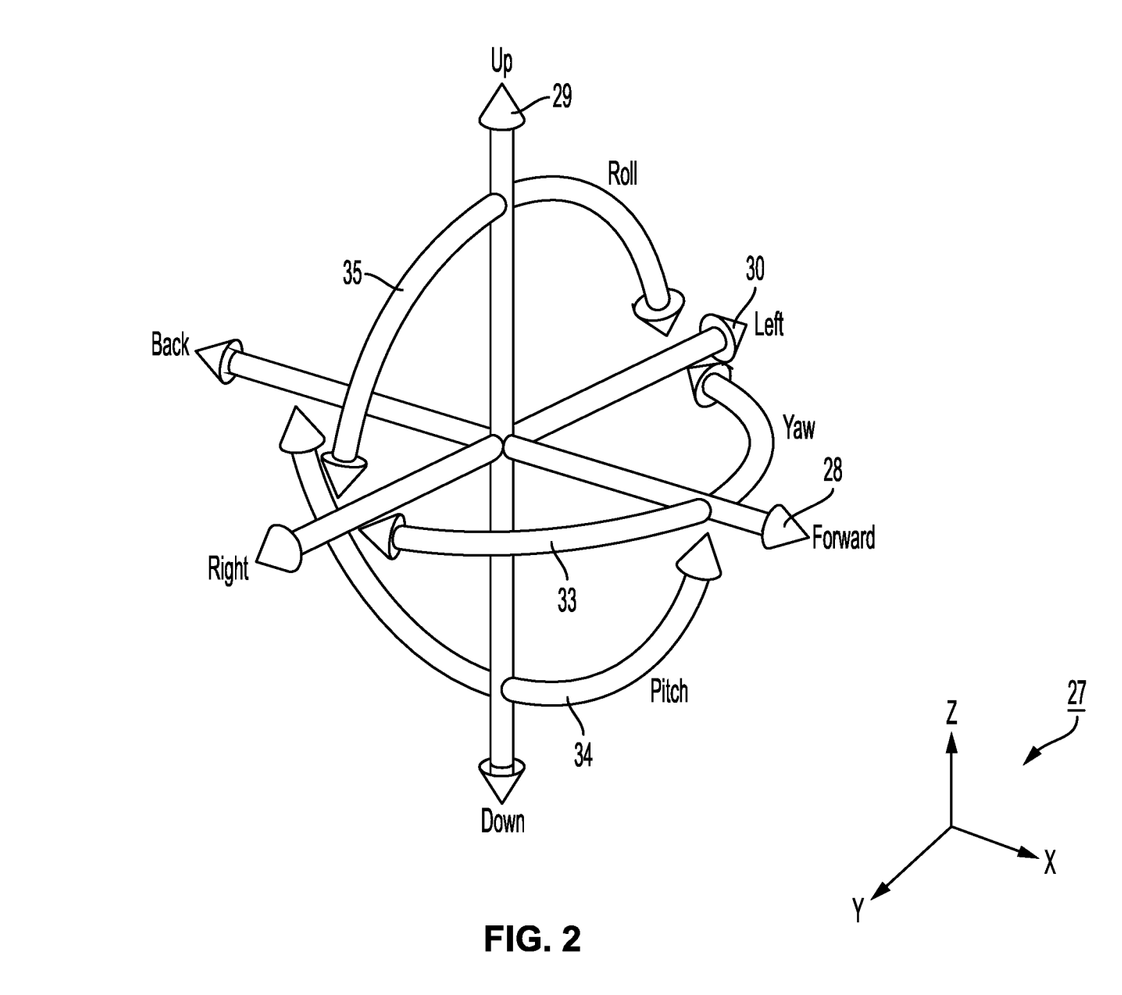
FIG. 2 is an illustration showing six degrees of freedom.

The end-effector, the robot body, or a combination of the end-effector and the robot body may move in three, four, five, or six degrees of freedom in order to move and to manipulate an element for lifting, stacking, removal, or movement. For example, the end-effector, the robot body, or a combination of the end-effector and the robot body may move in three, four, five, or six degrees of freedom in order to move and to manipulate one element to place that one element on top of another element of similar or different type. For example, the end-effector, the robot body, or a combination of the end-effector and the robot body may move in three, four, five, or six degrees of freedom in order to move and to manipulate one element to remove that element from atop another element of similar or different type. FIG. 2 shows movement in six degrees of freedom graphically relative to Cartesian X, Y, and Z axes 27. The six degrees of freedom include forward/backward (surge) 28, up/down (heave) 29, left/right (sway) 30, yaw 33, pitch 34, and roll 35.

In some implementations, the end-effector is controllable to move independently of the robot's body in three or more degrees of freedom which may include forward/backward, up/down, left/right, and at least one of yaw, pitch, or roll. In some implementations, the end-effector is controllable to move independently of the robot's body in at least five degrees of freedom which include forward/backward, up/down, left/right, and at least two of yaw, pitch, or roll. In some implementations, the end-effector is controllable to move independently of the robot's body in six degrees of freedom which include forward/backward, up/down, left/right, yaw, pitch, and roll. These movements enable movement of the element in three, four, five, or six degrees of freedom.

In some implementations, the robot's body is controllable to move in three degrees of freedom. In some implementations, the robot's body is controllable to move in at least four degrees of freedom which include forward/backward, up/down, left/right, and at least one of yaw, pitch, or roll. In some implementations, the robot's body is controllable to move in at least five degrees of freedom which include forward/backward, up/down, left/right, and at least two of yaw, pitch, or roll. In some implementations, the robot's body is controllable to move in six degrees of freedom which include forward/backward, up/down, left/right, yaw, pitch, and roll. These movements enable movement of the element in four, five, or six degrees of freedom.

Since the end-effector is connected to the robot's body, the end-effector may move along with the body. The end-effector may also be configured to make the above-described movements independently of the robot body. That is, the body may move in a number of degrees of freedom and the end-effector may move separately from the robot body in the same number of degrees of freedom, in fewer number of degrees of freedom, or in a greater number of degrees of freedom. For example, if the body moves forward, the end-effector may move forward along with the body but the end-effector may also move further forward or left/right independently of movement of the body.

In some implementations, the end-effector and the body are together controllable to move an element in three degrees of freedom. In some implementations, the end-effector and the body are together controllable to move an element in at least four degrees of freedom which include forward/backward, up/down, left/right, and at least one of yaw, pitch, or roll. In some implementations, the end-effector and the body are together controllable to move an element in at least five degrees of freedom which include forward/backward, up/down, left/right, and at least two of yaw, pitch, or roll. In some implementations, the end-effector and the body are together controllable to move an element in six degrees of freedom which include forward/backward, up/down, left/right, yaw, pitch, and roll. For example, the body may be configured to move forward/backward and left/right and the end-effector may be configured to move up/down and at least one of yaw, pitch, or roll (four degrees), at least two of yaw, pitch, or roll (five degrees), or all of yaw, pitch, or roll (six degrees). Different combinations of movements than those described here may be implemented.

Figure 3:
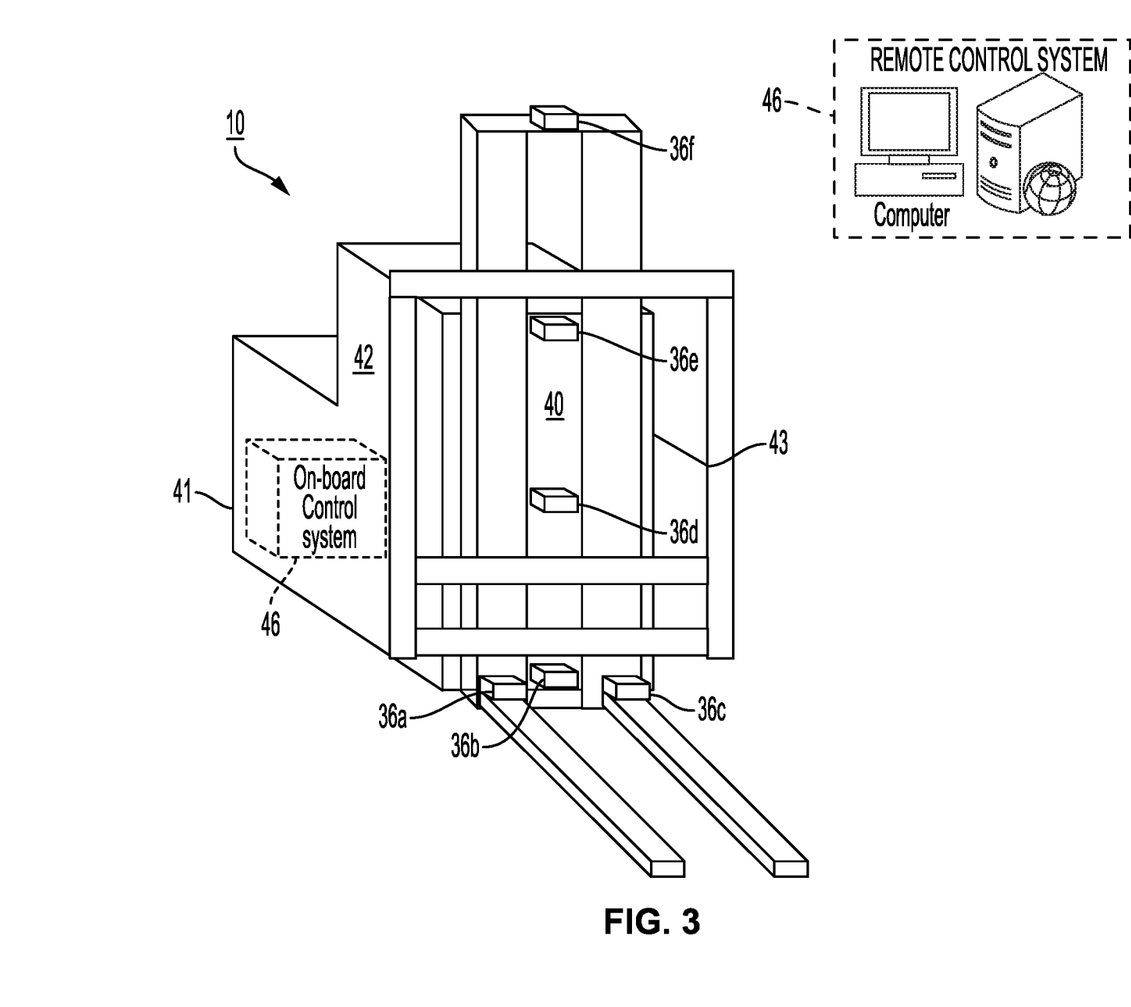
FIG. 3 is block diagram showing a perspective view of the autonomous vehicle of FIG. 1.

Referring also to the block diagram of FIG. 3, one or more sensors 36a, 36b, 36c, 36d, 36e, and 36f are located on robot 10 for use in detecting the location of the robot itself, for detecting an element to pick-up, and/or for detecting a location on which to place—for example, to stack—the element. The sensors are also usable to detect locations of alignment features on the elements and to track their location as the robot and/or the element moves relative to the stack. The sensors are configured to obtain 3D data at least from locations that are at least in front of the end-effector. Examples of sensors include 2D and 3D sensors. For example, robot 10 may include one or more 3D cameras, one or more light detection and ranging (LIDAR) scanners, one or more optical sensors, one or more sonar sensors, one or more time-of-flight (TOF) sensors, one or more radar sensors, one or more 2D camera sensors, one or more ultrasonic sensors, or any appropriate multiple numbers and/or combination thereof. To obtain 3D data using 2D sensors, multiple 2D sensors may be used. Notably, the example robot is not limited to these types of sensors.

In an example, robot 10 includes one or more 3D cameras at a front 40 of the robot. A 3D camera may capture, red, green, blue, and depth (RGBD) data. In this example, the front of the robot faces the direction of travel of the robot. In the example of FIG. 3, the front of the robot may include an arc spanning 180° or less from one side of the robot to the opposite side of the robot. In an example, robot 10 may include multiple LIDAR scanners at a front of the robot. Each LIDAR scanner is configured to detect objects within a sensing plane. Two or more LIDAR scanners may be configured and arranged to obtain 2D data in orthogonal sensing planes. This 2D data, when appropriately correlated and/or combined constitutes 3D information obtained from the front of the robot. Combinations of these and/or other sensors may be used to obtain 3D data representing the space in front of the robot. The 3D data may include 3D (e.g., Cartesian XYZ) coordinates representing the space.

In implementations that include multiple sensors on the front of the robot, the sensors may be located at different positions, for example at different heights. In addition, one or more the sensors may be movable on the robot. In some examples, sensors 36*a*, 36*c* may be located on, and movable with, the end-effector. A sensor located here enables the robot to detect and to image elements, such as a pallet or container, that are located directly in front of the end-effector. Data from such sensors enables the end-effector to identify sockets in the element and, therefore, facilitates entry of the end-effector into the sockets in the element. In some examples, one or more sensors may be located on the body of the robot. For example, one or more sensors 36*d* may be located at a mid-point of the robot, one or more sensors 36*b* may be located at a bottom of the robot, and/or one or more sensors 36*e* may be located above sensors 36*d*. One or more sensors 36*f* may be located at the top of the robot. Sensors strategically placed at these or other locations enable the robot to capture images of elements in front of the robot even when the robot is holding an element that blocks a sensor. Example elements include, but are not limited to, the following, a rack, a pallet, a fixed or movable device including a compatible interlocking mechanism, a stack of one or more elements, or a rack containing a stack of one or more element. For example, with proper placement, if one sensor is blocked—for example, by one or more element s on the end-effector, another sensor will not be blocked by those element s enabling for continuous sensing. Data captured by the sensors is sent the robot's control system for processing and use.

In some implementations, robot 10 may include additional sensors at locations other than the front of the robot. For example, sensors of the type described herein may be included on one or both sides of the robot and/or on the back of the robot. In this example, the back of the robot is the opposite side of the front of the robot. In the example of FIG. 3, the back 41 of the robot includes an arc spanning 180° or less from one side of the robot to the opposite side of the robot. In the example of FIG. 3, the sides 42, 43 of the robot may include an arc spanning 180° or less from the direction of travel of the robot to the direction opposite to the direction of travel of the robot. These sensors may assist in operations such as object detection and localization.

LIDAR scanners, 3D cameras, and/or any sensors constitute a vision system for the robot. Visual data obtained by the vision system may be used to determine a location of the robot within a space being traversed. In this regard, in some implementations, a control system 46 stores a map of the space to be traversed in computer memory. Components of control system 46 are shown in dashed lines in FIG. 3 because at least part of the control system may be internal to the robot. The map may be located on the robot or at any location that is accessible to the control system. The map may include locations of landmarks, such as columns, corners, windows, poles, and other distinguishable features of the space that act as references for the robot. The map may include dimensions and distinguishing characteristics, such as color, shape, texture, and so forth of landmarks, such as columns, walls, corners, windows, poles, and other distinguishable features of the space that act as references for the robot. The map may also include measurements indicating the size of the space, measurements indicating the size and locations of the landmarks, measurements indicating distances between landmarks, and coordinate information identifying where the landmarks are located in the space. The control system uses information in the map to move throughout the space and uses visual data from the vision system and data from the map to determine a location of the robot within the space. For example, the robot may identify the locations of three landmarks within the space. By knowing where the robot is relative to these landmarks, the locations of the landmarks on the map and thus within the space, and the distances between the landmarks, the control system can determine the location of the robot within the space. This information may be used to locate an element to pick-up or to locate another element on which to place—for example, to stack—the element the robot is holding or will hold. Examples of other elements include an element of like type, a compatible interlocking compatible device such as another element of like or different type, or a rack.

In some implementations, an on-board control system on the robot may use a pre-planned route through the map to identify where to locate an element to pick-up or to locate one or more of the following on which to place to pick up or to place an element: a stack of elements, a compatible interlocking device, or a rack. As described herein, a control system on the robot may not use a pre-planned route through the map to identify where to locate an element to pick-up or to locate one of the other elements from which to pick-up or to place the element. In an example, the robot may move through and around the space and, upon reaching an object, attempt to detect and to identify an element that the robot is controlled to move. As explained herein, identification and detection may be performed by capturing image data in a region of interest containing the element, filtering the image data to produce filtered data having less of an amount of data than the captured image data, and identifying components of the element by analyzing the filtered data using a deterministic process. The identification process may also include referencing a database comprised of a library containing attributes of elements. In some cases, after the robot identifies an element of interest, the robot may the move through and around the space to identify one of the other elements on which to place the element that the robot is holding.

The location of the other element may be pre-programmed or the robot may search through the space using its sensor systems to identify the other element. In this regard, in some implementations, the element or the other element on which to place the element the robot is holding may contain indicia such as a bar code, a QR code, or a serial number. The robot may identify such indicia on the element and other element, compare the identified indicia and, when a match is detected, determine that the element is to be placed on the other element. In some implementations, these operations may be performed based on dimensions of the element and the other element, or other distinguishing characteristics—such as color or markings—on the element and the other element. For example, operations may be executed by the control system to determine where to place a pallet or other element or from where to remove a pallet or other element. The operations may include detecting a rack containing a volume in which to place or from which to remove an element, pointing a sensor above a bottom of the rack to a region of interest, detecting the volume based on 3D data within a first part of the region of interest and a lack of 3D data within a second part of the region of interest, and determining, based on the 3D data and dimensions of the element, whether the volume is large enough to fit the element.

Control system 46 may include circuitry and/or an on-board computing system to control operations of the robot. The circuitry or on-board computing system is "on-board" in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. In some implementations, on-board components of the control system may communicate with a remote computing system. This computing system is remote in the sense that it is not located on the robot itself. For example, the control system can also include computing resources distributed to a remote—for example, a centralized or cloud—service at least a portion of which is not on-board the robot. Commands provide by the remote computing system may be transferred for execution by an on-board computing system. In some implementations, the control system includes only on-board components. In some implementations, the control system includes a combination of on-board components and the remote computing system. In some implementations, the control system may be configured—for example programmed—to implement control functions and robot movement absent either local or remote input from a user. In some implementations, the control system may be configured to implement control functions, including localization, based at least in part on input from a user.

In some implementations, the remote control system may include a fleet control system. The fleet control system may include one or more computing devices that operate together to control, to influence, or to instruct multiple robots of the type described herein. For example, the fleet control system may be configured to coordinate operations of multiple robots, including instructing movement of a robot to a position where an element is located and to a position where the element is to be stacked (for example, placed). For example, the fleet control system may be configured to coordinate operations of multiple robots, including instructing movement of a robot to a position where an element is to be picked-up. In some implementations, the fleet control system may store, maintain, and update the map of the space in which the robot or robots are to operate. The map may be accessed by each robot through the fleet control system or the map may be downloaded periodically, intermittently, or sporadically to all or some robots operating in the space. For example, the robot may use the map to position itself proximate to an element in order to pick-up the element; the robot may use the map to navigate towards another element on which the robot is to place the element that the robot has picked-up; and the robot may use the map to position itself proximate to the other element on which the robot is to place the element that the robot has picked-up. In this example, positioning may include moving robot so that its end-effector aligns to sockets in the element that is to be picked-up, which may include moving the body, the end-effector, or both. The map may also be used to identify an existing rack or stack from which to pick-up an element.

In some implementations, the control system, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

The control system, whether on-board the robot, remote from the robot, or a combination of on-board and remote, may include computer memory storing a database comprising a library of data identifying different types of elements and attributes of the different types of elements. For example, the database may include attributes identifying the make of an element, the model of an element, the number of sockets in an element, the dimensions of an element including length, width, and depth (XYZ), the material of which the element is made, the weight of the element, the element alignment (or stacking) features, indicia or markings on the elements such as color, serial number, bar codes, QR codes, and the like, and any other appropriate information that the robot may need to pick-up the element, to move the element, and/or to stack the element on another element such as a rack or compatible interlocking device such as another element. This information may be usable by the robot to identify the element and to control its body and/or its end-effector to pick-up and to move the element. For example, an on-board control system on the robot may obtain information from a local or remote database of this type and may use that information to recognize the element and to pick-up and/or to stack the element as described herein.

Figure 5:
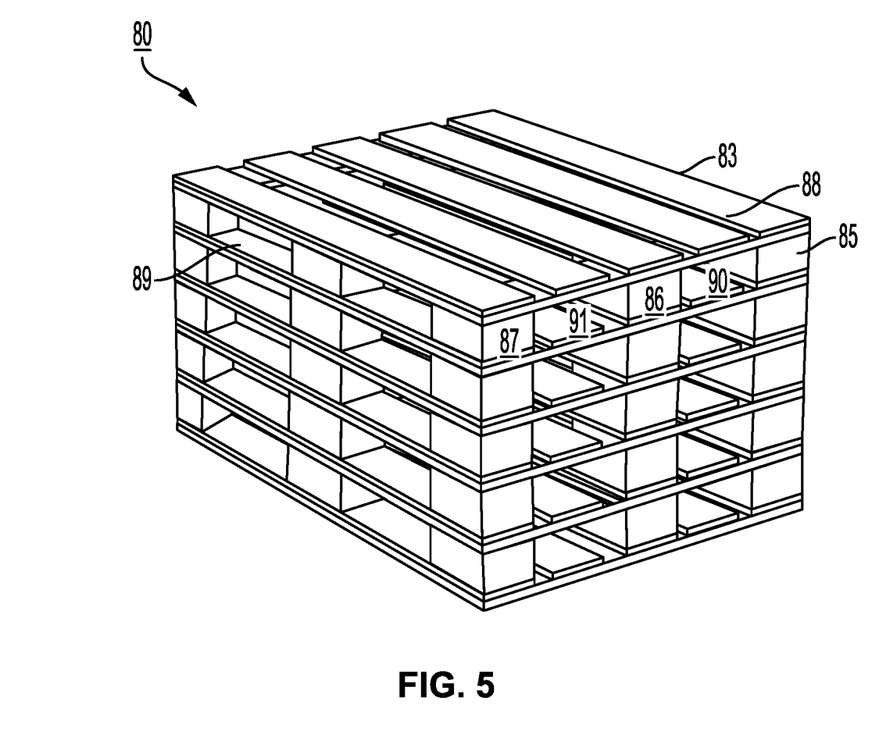
FIG. 5 is a photorealistic diagram showing a perspective view of an example stack of pallets.
Figure 6:
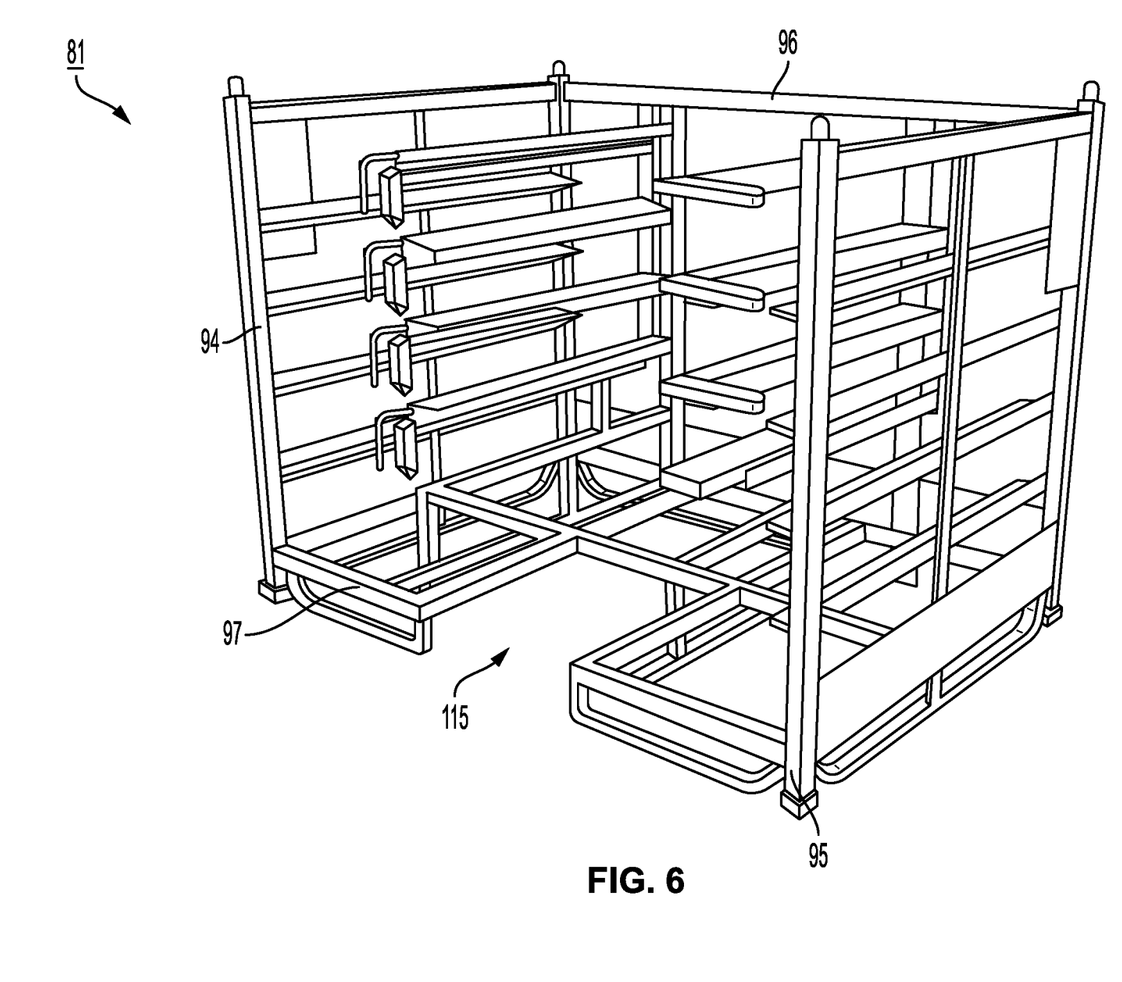
FIG. 6 is a diagram show a perspective view of an example rack that may be used for stacking elements.

In this regard, different types of elements may be comprised of different types of components. For example, a pallet, such as pallet 83 of FIG. 5, may include pillars 85, 86, and 87, and decks 88 and 89. Pallet 83 may also include sockets 90 and 91. For example, a rack, such as rack 81 of FIG. 6, may include vertical pillars such as 94, 95 and horizontal beams such as 96, 97. The techniques described herein may be used to detect those components, volumes bounded by those components, or both the components and volumes. The information—for example, data—representing the components, volumes, or both are used for detection, including identification.

Figure 4:
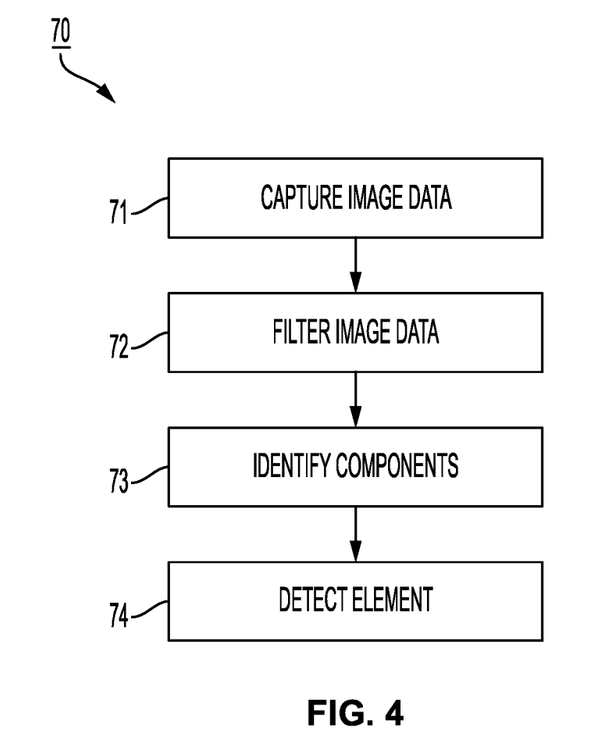
FIG. 4 is a flowchart showing operations included in an example process for detecting an element using an autonomous vehicle.

Referring to FIG. 4, the following operations may be used to detect an element, such as a pallet, using a robot. The operations may be performed in whole or in part by the robot's control system which, as described herein, may be on-board or remote. The operations may be performed in whole or in part using one or more computing systems that are separate from, and in communication with, the robot's control system.

The robot may be controlled to move to the vicinity of an element of interest and to position or to direct its sensors based on an expected location of the element. The expected location may be programmed into the control system or obtained from a remote computing system. In FIG. 4, operations 70 to detect that element include using a sensor on the autonomous vehicle to capture (71) image data in a region of interest containing an element. For example, one or more of sensors 36a, 36b, 36c, 36d, 36e, or 36f may be directed at the element to obtain image data representing components of the element. In some implementations, the image data may be 3D data captured by sensors such as a 3D camera or multiple LIDAR sensors. In an example, the image data defines a point cloud. An example point cloud includes a dataset that represents the element (e.g., a pallet). Each point in the dataset represents 3D—for example, Cartesian X, Y, and Z—geometric coordinates of a single point on an underlying sampled surface (the element). FIG.

Figure 7:
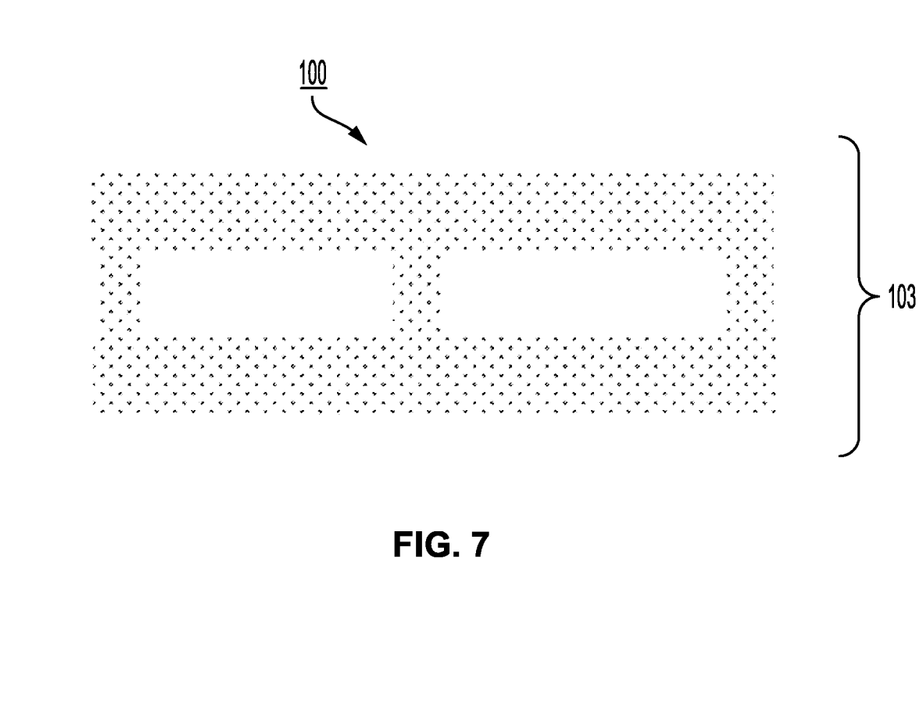
FIG. 7 is a block diagram showing an example point cloud representing a pallet.

7 shows an example of a point cloud 100 representing a pallet. The image data may be filtered (72) using the control system to produce filtered data having less of an amount of data than the image data.

Figure 8:
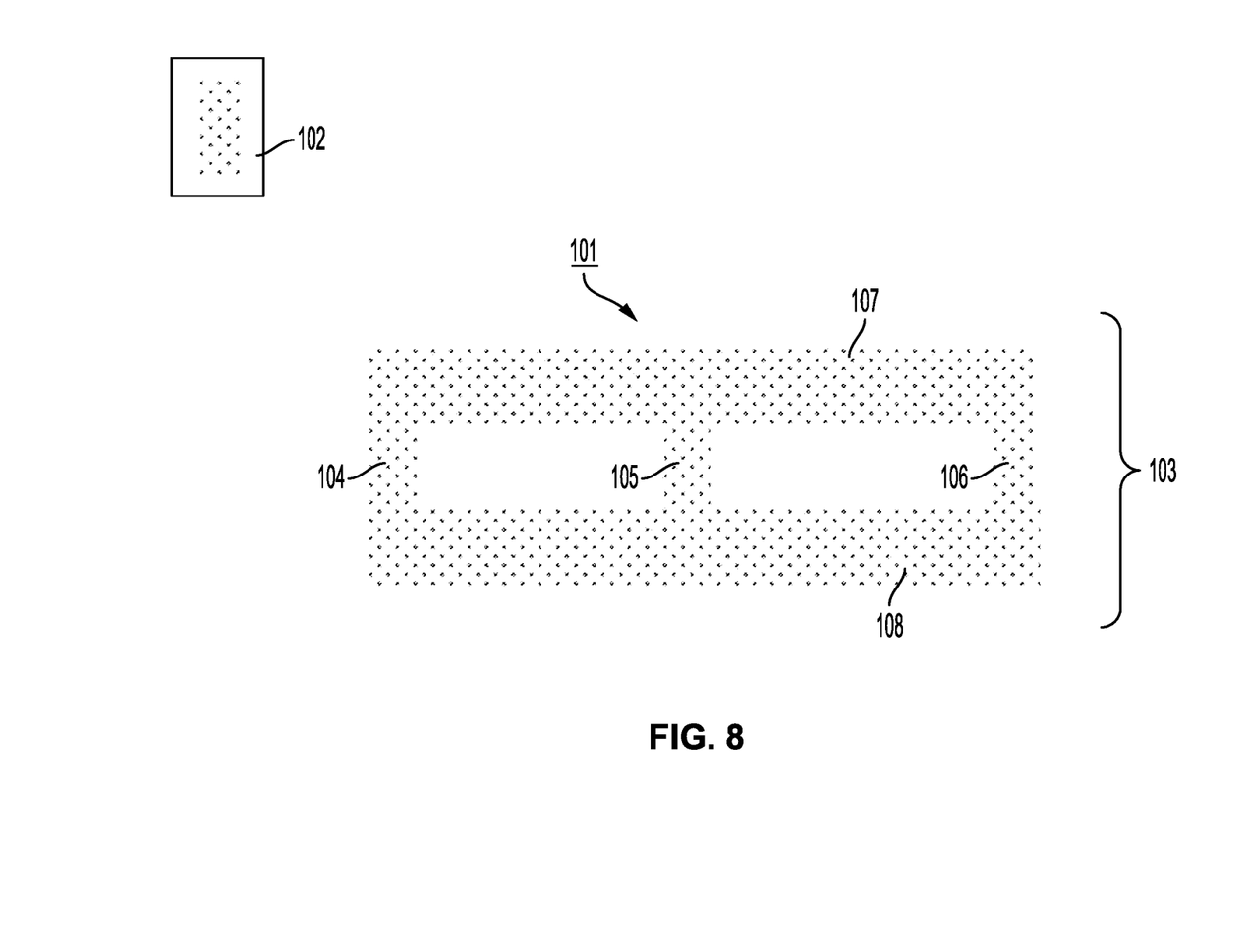
FIG. 8 is a block diagram showing a filtered version of the point cloud of FIG. 7.

The filtering process may include reducing the number of points in the point cloud. For example, voxel grid filtering may be performed to reduce the number of points in the point cloud. In an example filtering process, down-sampling may be performed to achieve a reduction in spatial resolution while keeping the same 3D representation of the element represented by the point cloud. The down-sampling may include voxel grid filtering. Voxel grid filtering down-samples the data by taking a spatial average of points in the cloud. Voxel grid filtering includes dividing a space containing the point cloud into a regular grid of rectangles. The rectangles are known as voxels. A set of points that are within the bounds of a voxel are assigned to that voxel and are combined into one output point. That one output point represents the voxel and is substituted in the point cloud for all of the points in the voxel. Accordingly, the filtered data remains a point cloud, but one that has fewer points than the original point cloud representing the captured image data. In an example, the number of points may be reduced by a factor of 300 or more. The resulting filtered point cloud however still includes points arranged based on the shape of the element. FIG. 8 shows an example of a point cloud 101 that is a filtered version of point cloud 100. The lower concentration of points in cloud 101 represents the reduction in data.

In some implementations, data in the point cloud also may be filtered based, at least in part, on a known configuration of the element. For example, regions of interest in the original point cloud or the filtered point cloud may be identified based on the expected location of the element. Those regions of interest may be expected to contain the element with a degree of certainty. Points outside the region of interested may be discarded or not considered. For example, in FIG. 8, points within region 102 enclosed by a rectangle may be discarded because they are well outside the region of interest.

Operations 70 include identifying (73) components of the element by analyzing the filtered data using a deterministic process. An example deterministic process includes a process having a behavior that is entirely determined by its initial state and inputs, and that is not random or stochastic. In example, components of the element may include pillars, decks, or beams, as described previously. In the example of FIG. 8, a pallet 103 may include three vertical pillars 104, 105, 106 and two horizontal decks 107, 108 (which have not yet been identified). The pillars and decks are represented by clustered points in the filtered point cloud. As shown, their general shapes are recognizable and they are detected as described herein.

Operations for identifying (73) the components may include locating one or multiple structures represented by the filtered data that extend along a first dimension and that are separated by a predefined space. Operations for identifying (73) the components may include locating one or multiple structures represented by the filtered data that extend along a second, different dimension and that are separated by a predefined space. For example, these operations may include locating structures that extend along a horizontal dimension (such as decks) and structures that extend along a vertical dimension (such as pillars). A known or expected geometry of the element that is being identified dictates the expected locations and spaces between the various structures in the filtered point cloud. For example, for a pallet having three pillars, the expected distance between two adjacent pillars may be X (X>1) centimeters (cm) and the expected distance between two decks may be Y (Y>1) cm.

The deterministic process for identifying components in the filtered point cloud may be based, at least in part, on shapes of the components. An example deterministic process includes identifying clusters of points having predefined connectivity, detecting clusters that are a predefined distance apart from a nearest neighboring cluster, and in some cases eliminating at least one of the clusters from consideration for not meeting a predefined condition. In some implementations, no clusters are eliminated, such as when the only entity visible is a pallet and a camera is placed in an ideal location with respect to the pallet. The predefined distance may be tunable and may be based on the geometry of the element being detected. For example, if the expected distance between two adjacent pillars 104, 105 is X cm, the predefined distance will be X cm. The predefined connectivity may correspond, for example, to points having co-linearity or that represent a predefined shape such as a vertical pillar. A collinearity error threshold or errors/offsets in other criteria can be tuned similar to the distance tuning. In an example, co-linear points may include adjacent points along a same dimension or at an angle relative to the dimension if there is a discontinuity in the points along the dimension. For example, adjacent points along a same dimension having a length that roughly corresponds to a component of the element—such as a pillar of a pallet—may be indicative of a cluster representing the component in the point cloud. In some cases, a discontinuity in the point cloud may be present which may be caused, for example, by reflections or other image data artifacts. In such cases, if the points are continuous along a dimension, then continuous at angles (for example, upslope then downslope) relative to the discontinuity and, after the discontinuity, proceed again along the dimension, then the points may be indicative of a cluster representing the component in the point cloud regardless of the discontinuity The clusters constitute candidates for the components of the element—for example, the pillars and/or decks of a pallet or the vertical pillars and horizontal beams of a rack. Detecting (74) an element from among the candidates includes conducting a voting process to identify those candidates that qualify as components and comparing the qualified components to an expected configuration of the element. In this regard, points, whether vertical, horizontal, or angular relative to the vertical or horizontal axes, should be within a predefined distance of each other to be considered sufficiently co-linear. The predefined distance may be based, in part, on the resolution of the point cloud. In an example, the voting process includes determining whether points in each cluster meet predefined co-linearity and distance tolerances. If more than a predefined number of points in a cluster meet the predefined co-linearity and distance tolerances, and the cluster is at an expected location for a component, then the cluster is deemed to qualify as a component. Voting may include comparing selected points in a cluster to one or more adjacent points and increasing or decreasing a vote based on whether the selected points meet the predefined tolerances. For example, the vote may be increased if the points are within a predefined distance from each other and decreased if the points are outside of that predefined distance. For example, the vote may be increased if the points are on a line or within a predefined distance of a line and decreased if the points are not on the line and within the predefined distance of the line. The aggregate vote may be compared to a threshold, which may tuned in software. If the vote exceeds the threshold, the cluster may qualify as a component. After two or more components are identified, they are compared to an expected configuration of the element. If the multiple components compare favorably to the expected configuration—for example, the components match or are within an acceptable error of the expected configuration, then the components are recognized as the element.

In some implementations, it is possible to identify an element, such as a pallet, by considering components in one dimension only, such as by considering pillars. Components that extend alone a second, different dimension, such as the decks may be considered to add to robustness to the detection.

Figure 9:
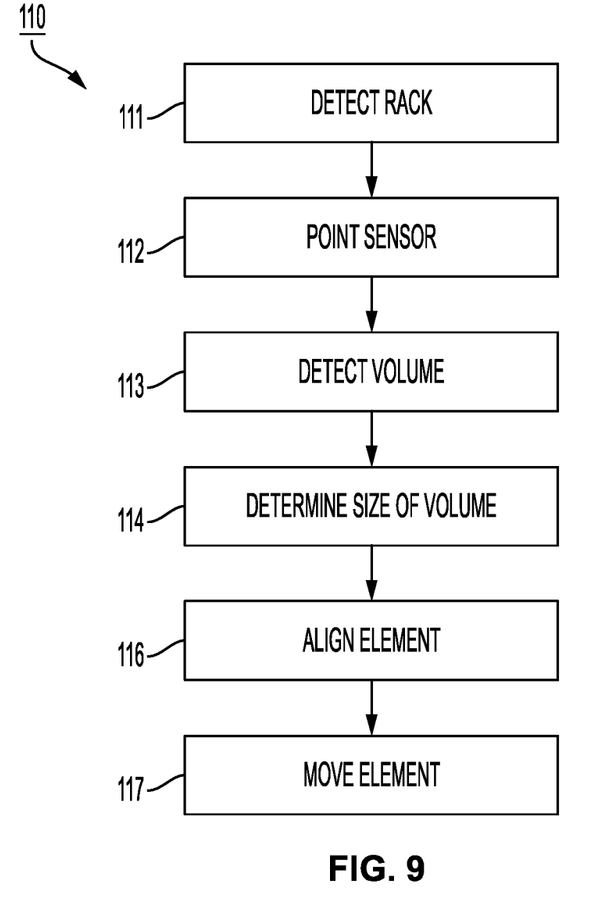
FIG. 9 is a flowchart showing operations included in an example process for detecting a volume in which to place an element.

Referring to FIG. 9, the following operations may be used for detecting a volume in which to place an element. The volume may be, for example, in a rack or other container. The operations may be performed in whole or in part by the robot's control system which, as described herein, may be on-board or remote. The operations may be performed in whole or in part using one or more computing systems that are separate from, and in communication with, the robot's control system.

Operations 110 are described with respect to a rack and a pallet element; however, they may be performed for any appropriate type of volume that holds any appropriate type of element. Operations 110 include detecting (111) a rack containing the volume. The rack may be detected as described by executing operations 70 of FIG. 4. For example, a sensor on a robot captures image data representing components of the rack in a region of interest containing the rack; the image data is filtered to produce filtered data having less of an amount of data than the image data; components of the rack—such as horizontal and vertical beams—are identified by analyzing the filtered data using a deterministic process; and the rack is detecting based on the components. For example, the components are compared to predefined rack configurations in the database and the one that matches is identified as the rack. This information may be used to determine where to look for a volume in which to place an element. In this regard, the rack may be partially full and, therefore, there is still a need to identify regions of the rack that are available to receive an element. In some implementations, when detecting a rack, a sensor might be at a center of the rack with only the horizontal rack beam visible. In such a case pillars may not be considered. For example, when a sensor is directed towards (e.g., looking at) a center, there may be just one structure of interest, such as a horizontal beam that is part of the rack. When the sensor is directed towards the rack's ends, then the rack's pillars may be visible and considered. In some implementations, detecting a rack may include detecting only a single component such as a horizontal beam identifying the bottom part of the rack.

Operations 110 also include pointing (112) a sensor such as a 3D camera, a LIDAR sensor, or any of the sensors described herein above a bottom of the rack to a region of interest where a pallet is to be placed. A volume of the region of interest is detected (113) by detecting 3D data within a first part of the region of interest and a lack of 3D data within a second part of the region of interest. For example, the first part may include components of the rack and the second part may be empty space where the pallet is to be placed. In an example, detecting 3D data within the first part of the region includes outputting light and detecting reflection of the light. The reflection is off of components in the region, such as pillars or beams that are part of the rack. The reflection may be off of other elements already stacked in the rack. To detect the volume such as volume 115 of rack 81 (FIG. 6), it is attempted to detect 3D data within a region expected to contain the volume. Attempting detection includes outputting light in the region and detecting less than a predetermined amount of 3D data by receiving less than a predetermined amount of light reflection. For example, no light reflection may be received in some cases. This would be expected of the volume, since the volume is empty or mostly empty and there are no or fewer components therein to reflect light. Accordingly, if there is less than a predetermined amount of 3D data within part of a region within a rack, then that part of the region may be deemed to be the volume. The size of the volume may be determined in this manner—that is, by identifying boundaries of the region from which no reflections or 3D data are received.

Operations 110 include determining (114), based on the 3D data that was received and the lack thereof in a region and dimensions of the element, whether the volume is large enough to fit the element. In this regard, the dimensions of the element may be detected as described herein or may be programmed into the robot or otherwise known beforehand. The dimensions of the element are compared to the size of the volume. If the volume is larger than the element, then it is determined that the element will fit within the volume. The element may be aligned (116) within the volume. If the rack is empty, this may be done based on knowledge of the rack's geometry. If the rack is not empty—for example, the rack may contain a stack of pallets—the top pallet in the stack may be identified using operations 70 or any other appropriate methodology. The robot then moves (117) the element into the rack and places it at an appropriate location, for example, on the rack itself or a stack held in the rack.

The example autonomous vehicles described herein may be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method performed for an autonomous vehicle to detect a volume in which to place an element, the method comprising:
    detecting a rack containing the volume;
    controlling a sensor to detect three-dimensional (3D) data above a bottom of the rack in a region of interest;
    detecting the volume based on at least part of the 3D data within a first part of the region of interest and less than a predetermined amount of the 3D data within a second part of the region of interest that is expected to contain the volume based on the at least part of the 3D data within the first part of the region; and
    determining, based on the volume and dimensions of the element, whether the volume is large enough to fit the element;
    wherein detecting the volume comprises:
        detecting less than the predetermined amount of 3D data within the second part of the region of interest;
        detecting boundaries of the second part of the region of interest, the boundaries being based on where there is less than the predetermined amount of 3D data; and
        determining the volume based on the boundaries.

2. The method of claim 1, further comprising:
    detecting the element by performing operations comprising:
        using the sensor on the autonomous vehicle to capture image data in a region of interest containing the element, the image data representing components of the element;
        filtering the image data to produce filtered data having less of an amount of data than the image data;
        identifying candidates for the components of the element by analyzing the filtered data using a deterministic process, where identifying the candidates for the components comprises locating multiple structures represented by the filtered data;
        voting on whether each of the multiple structures meets one or more predefined tolerances, where voting comprises assigning one or more points to each of the multiple structures so that at least two of the multiple structures have scores that exceed a threshold; and
        detecting the element by comparing the least two of the multiple structures to a predefined configuration.

3. The method of claim 1, wherein detecting the volume comprises:
    detecting the at least part of the 3D data within the first part of the region of interest by outputting light and detecting reflection of the light; and
    wherein detecting less than the predetermined amount of 3D data comprises detecting less than a predetermined amount of light reflection.

4. The method of claim 3, wherein detecting less than the predetermined amount of light reflection comprises detecting no light reflection.

5. The method of claim 1, further comprising:
    aligning the element within the volume.

6. The method of claim 1, wherein detecting the rack comprises:
    using the sensor to capture image data in a region of interest containing the rack, the image data representing components of the rack;
    identifying the components of the rack by analyzing the image data using a deterministic process; and
    detecting the rack based on the components.

7. The method of claim 6, wherein the components comprise pillars; and
    wherein identifying the pillars comprises locating one or more structures represented by the image data that extend along a same dimension and that are separated by a predefined space.

8. The method of claim 7, wherein the components comprise beams; and
    wherein identifying the beams comprises locating one or more structures represented by the image data that extend along a same dimension and that are separated by a predefined space.

9. The method of claim 7, wherein the components comprise beams and the same dimension is a first dimension; and
    wherein identifying the beams comprises locating multiple structures represented by the image data that extend along a second dimension that is different from the first dimension; and
    wherein the first dimension is a vertical dimension in 3D space and the second dimension is a horizontal dimension in the 3D space.

10. The method of claim 6, further comprising:
    storing a library containing attributes of different types of racks;
    wherein the components are identified based, at least in part, on one or more attributes from the library.

11. One or more non-transitory machine-readable media storing instructions that are executable to perform operations that implement the method of claim 1.

12. A system comprising:
    an autonomous vehicle comprising a sensor to capture data; and
    a control system to perform operations comprising:
        detecting a rack containing a volume based on data obtained from the sensor about the rack;
        controlling the sensor to detect three-dimensional (3D) data above a bottom of the rack in a region of interest;
        detecting the volume based on at least part of the 3D data within a first part of the region of interest and less than a predetermined amount of the 3D data within a second part of the region of interest that is expected to contain the volume based on the at least part of the 3D data within the first part of the region; and determining, based on the volume and dimensions of an element, whether the volume is large enough to fit the element;

wherein detecting the volume comprises:
  detecting less than the predetermined amount of 3D data within the second part of the region of interest;
  detecting boundaries of the second part of the region of interest, the boundaries being based on where there is less than the predetermined amount of 3D data; and
  determining the volume based on the boundaries.

13. The system of claim 12, wherein the operations comprise detecting the element, wherein detecting the element comprises:
  a controlling the sensor to capture image data in a region of interest containing the element, the image data representing components of the element;
  filtering the image data to produce filtered data having less of an amount of data than the image data;
  identifying candidates for the components of the element by analyzing the filtered data using a deterministic process, where identifying the candidates for the components comprises locating multiple structures represented by the filtered data;
  voting on whether each of the multiple structures meets one or more predefined tolerances, where voting comprises assigning one or more points to each of the multiple structures so that at least two of the multiple structures have scores that exceed a threshold; and
  detecting the element by comparing the least two of the multiple structures to a predefined configuration.

14. The system of claim 12 wherein detecting the volume comprises:
  detecting the at least part of the 3D data within the first part of the region of interest by outputting light and detecting reflection of the light; and wherein detecting less than the predetermined amount of 3D data comprises detecting less than a predetermined amount of light reflection.

15. The system of claim 14, wherein detecting less than the predetermined amount of light reflection comprises detecting no light reflection.

16. The system of claim 12, wherein the control system is configured to control the autonomous vehicle to align the element within the volume.

17. The system of claim 12, wherein detecting the rack comprises:
  controlling the sensor to capture image data in a region of interest containing the rack, the image data representing components of the rack;
  identifying the components of the rack by analyzing the image data using a deterministic process; and
  detecting the rack based on the components.

18. The system of claim 17, wherein the components comprise pillars; and
  wherein identifying the pillars comprises locating one or more structures represented by the image data that extend along a same dimension and that are separated by a predefined space.

19. The system of claim 18, wherein the components comprise beams; and
  wherein identifying the beams comprises locating one or more structures represented by the image data that extend along a same dimension and that are separated by a predefined space.

20. The system of claim 18, wherein the components comprise beams and the same dimension is a first dimension; and
  wherein identifying the beams comprises locating multiple structures represented by the image data that extend along a second dimension that is different from the first dimension; and
  wherein the first dimension is a vertical dimension in 3D space and the second dimension is a horizontal dimension in the 3D space.

21. The system of claim 17, further comprising:
memory storing a library containing attributes of different types of racks;
  wherein the components are identified based, at least in part, on one or more attributes from the library.

* * * * *